(12) United States Patent
Blakeman et al.

(10) Patent No.: US 7,178,331 B2
(45) Date of Patent: Feb. 20, 2007

(54) EXHAUST SYSTEM FOR LEAN BURN IC ENGINES

(75) Inventors: Philip Gerald Blakeman, Cambridge (GB); Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 10/526,511

(22) PCT Filed: Sep. 3, 2003

(86) PCT No.: PCT/GB03/03827

§ 371 (c)(1),
(2), (4) Date: Jun. 5, 2006

(87) PCT Pub. No.: WO2004/022935

PCT Pub. Date: Mar. 18, 2004

(65) Prior Publication Data

US 2006/0254258 A1   Nov. 16, 2006

(30) Foreign Application Priority Data

Sep. 5, 2002   (GB) ................................. 0220645.6

(51) Int. Cl.
*F01N 3/10* (2006.01)
(52) U.S. Cl. ............................ 60/301; 60/274; 60/286; 60/295; 60/297; 60/303; 422/170; 422/172; 422/177
(58) Field of Classification Search .................. 60/274, 60/285, 286, 295, 297, 301, 303; 422/169, 422/170, 171, 172, 177
See application file for complete search history.

(56) References Cited

U.S. PATENT DOCUMENTS 4,902,487 A    2/1990   Cooper et al.

(Continued)

FOREIGN PATENT DOCUMENTS

DE    199 21 974 A1    11/2000

(Continued)

OTHER PUBLICATIONS

P. G. Blakeman et al., "Investigations into $NO_x$ Aftertreatment with Urea SCR for Light-Duty Diesel Vehicles," *SAE Technical Paper Series*, Paper No. 2001-01-3624, Presented at the International Fall fuels and Lubricants Meeting and Exposition, San Antonio, Texas, Sep. 24-27, 2001.

(Continued)

*Primary Examiner*—Binh Q. Tran
(74) *Attorney, Agent, or Firm*—RatnerPrestia (57) ABSTRACT

An exhaust system (10) for a lean-burn internal combustion engine comprises a nitrogen oxide ($NO_x$) absorbent (28), a catalyst (30) for catalyzing the selective catalytic reduction (SCR) of a $NO_x$ with a $NO_x$ specific reactant, first means (18, 22) for introducing a $NO_x$ specific reactant or a precursor thereof into an exhaust gas upstream of the SCR catalyst (30) and means (24) for controlling the introduction of the $NO_x$-specific reactant or precursor thereof into the exhaust gas via the first introducing means (18, 22), wherein the SCR catalyst (30) is disposed upstream of the $NO_x$ absorbent (28) and optionally with the $NO_x$ absorbent, wherein the control means (24) is arranged to introduce the $NO_x$-specific reactant or the precursor thereof to exhaust gas via the first introducing means (18, 22) only when the SCR catalyst (30) is active, whereby exhaustion of $NO_x$-specific reactant to atmosphere is substantially prevented.

55 Claims, 3 Drawing Sheets

U.S. PATENT DOCUMENTS

| | | | |
|---|---|---|---|
| 5,785,937 A | 7/1998 | Neufert et al. | |
| 5,968,464 A | 10/1999 | Peter-Hoblyn et al. | |
| 6,125,629 A | 10/2000 | Patchett | |
| 6,192,676 B1 | 2/2001 | Zürbig et al. | |
| 6,354,079 B1 | 3/2002 | Choi et al. | |
| 6,415,602 B1 | 7/2002 | Patchett et al. | |
| 6,508,057 B1 | 1/2003 | Bouchez et al. | |
| 6,662,553 B2 * | 12/2003 | Patchett et al. | 60/286 |
| 6,718,757 B2 * | 4/2004 | Khair et al. | 60/286 |
| 6,877,313 B1 * | 4/2005 | Phillips et al. | 60/297 |
| 6,941,748 B2 * | 9/2005 | Pott et al. | 60/295 |
| 6,996,975 B2 * | 2/2006 | Radhamohan et al. | 60/286 |
| 7,063,642 B1 * | 6/2006 | Hu et al. | 477/100 |
| 2002/0073692 A1 | 6/2002 | Katashiba et al. | |

FOREIGN PATENT DOCUMENTS

| | | |
|---|---|---|
| EP | 0 341 832 A2 | 11/1989 |
| EP | 0 487 886 A1 | 6/1992 |
| EP | 0 747 581 A1 | 12/1996 |
| EP | 1 008 379 A1 | 6/2000 |
| EP | 1 069-288 A2 | 1/2001 |
| EP | 1 149 991 A2 | 10/2001 |
| GB | 2 319 192 A | 5/1998 |
| JP | 11-013456 | 1/1999 |
| WO | WO-99/55446 A1 | 11/1999 |
| WO | WO-00/21647 A1 | 4/2000 |
| WO | WO-00/74823 A1 | 12/2000 |
| WO | WO-01/04466 A1 | 1/2001 |
| WO | WO-02/068099 A1 | 9/2002 |
| WO | WO-03/054364 A2 | 7/2003 |

OTHER PUBLICATIONS

Alan Bunting, "Springing the trap: Alan Bunting reports on a new particulate matter trap, claimed to be world-beater by maker Johnson Mathey," *Emissions*, May 2000, pp. 73-74.

* cited by examiner

EXHAUST SYSTEM FOR LEAN BURN IC ENGINES

This application is the U.S. national phase application of PCT International Application No. PCT/GB2003/003827, filed Sep. 3, 2003, and claims priority of British Patent Application No. 0220645.6, filed Sep. 5, 2002.

FIELD OF THE INVENTION

The present invention relates to an exhaust system for a lean-burn internal combustion engine, which exhaust system comprising a $NO_x$ trap and a catalyst for catalysing the reduction of $NO_x$ with a $NO_x$ specific reactant, e.g. $NH_3$.

BACKGROUND OF THE INVENTION

By "$NO_x$ specific reactant" herein, we mean a reducing agent that, in most conditions, preferentially reduces $NO_x$ instead of other components of a gaseous mixture. Examples of $NO_x$-specific reactants include nitrogenous compounds such as nitrogen hydrides, e.g. ammonia ($NH_3$) or hydrazine, or an $NH_3$ precursor.

By "$NH_3$ precursor" we mean one or more compounds from which $NH_3$ can be derived, e.g. by hydrolysis. These include urea ($CO(NH_2)_2$) as an aqueous solution or as a solid or ammonium carbamate ($NH_2COONH_4$). If the urea is used as an aqueous solution, a eutectic mixture, e.g. a 32.5% $NH_3$ (aq), is preferred. Additives can be included in the aqueous solutions to reduce the crystallisation temperature.

Urea hydrolyses at temperatures above 160° C. according to equation (1) to liberate $NH_3$ itself. It also thermally decomposes at this temperature and above according to equations (2) and (3) resulting in reduction of $NO_x$.

$$CO(NH_2)_2 + H_2O \rightarrow 2NH_3 + CO_2 \quad (1)$$

$$CO(NH_2)_2 \rightarrow \cdot NH_2 + CO \quad (2)$$

$$\cdot NH_2 + NO \rightarrow N_2 + H_2O \quad (3)$$

The $NH_3$ can be in anhydrous form or as an aqueous solution, for example.

The application of $NH_3$ SCR technology to treat $NO_x$ emissions from IC engines, particularly lean-burn IC engines, is well known. Several chemical reactions occur in the $NH_3$ SCR system, all of which represent desirable reactions which reduce $NO_x$ to elemental nitrogen. The dominant reaction mechanism is represented in equation (4).

$$4NO + 4NH_3 + O_2 \rightarrow 4N_2 + 6H_2O \quad (4)$$

Competing, non-selective reactions with oxygen can produce secondary emissions or may unproductively consume $NH_3$. One such non-selective reaction is the complete oxidation of $NH_3$, represented in equation (5).

$$4NH_3 + 5O_2 \rightarrow 4NO + 6H_2O \quad (5)$$

Presently, urea is the preferred source of $NH_3$ for mobile applications because it is less toxic than $NH_3$, it is easy to transport and handle, is inexpensive and commonly available.

Early methods of using urea as a source of $NH_3$ in exhaust systems involved injecting urea directly into the exhaust gas, optionally over an in-line hydrolysis catalyst (see EP-A-0487886 (incorporated herein by reference)). However, not all urea is hydrolysed in such arrangements, particularly at lower temperatures.

Incomplete hydrolysis of urea can lead to increased PM emissions on tests for meeting the relevant emission test cycle because partially hydrolysed urea solids or droplets will be trapped by the filter paper used in the legislative test for PM and counted as PM mass. Furthermore, the release of certain products of incomplete urea hydrolysis, such as cyanuric acid, is environmentally undesirable. Another method is to use a pre-injection hydrolysis reactor (see U.S. Pat. No. 5,968,464 (incorporated herein by reference)) held at a temperature above that at which urea hydrolyses.

It will be appreciated that at lower temperatures, below about 100–200° C., $NH_3$ can also react with $NO_2$ to produce explosive ammonium nitrate ($NH_4NO_3$) according to equation (6):

$$2NH_3 + 2NO_2 + H_2O \rightarrow NH_4NO_3 + NH_4NO_2 \quad (6)$$

For the avoidance of doubt, the present invention does not embrace such reactions or the promotion of conditions which bring them about. For example, the reaction can be avoided by ensuring that the temperature does not fall below about 200° C. or by supplying into a gas stream less than the precise amount of $NH_3$ necessary for the stoichiometric reaction with $NO_x$ (1 to 1 mole ratio). For cold start applications, measures to prevent water from contacting the catalyst can be adopted. These can include disposing a water trap, e.g. a zeolite, upstream of the catalyst to reduce the amount of water vapour contacting the catalyst until it is heated sufficiently. A water trap can also be positioned downstream of the catalyst, to prevent atmospheric humid air from travelling up the exhaust pipe. An electric heater can also be employed to drive off moisture from the catalyst pre-cold start. Such arrangements are described in our EP 0747581, (incorporated herein by reference).

In order to meet existing and future emission legislation, generally a vehicular exhaust system includes one or more components, such as catalysts. One of the legislated exhaust gas components is $NO_x$. During normal operation, the exhaust gas produced by a lean-burn internal combustion engine, for example, includes an excess of oxygen and oxidising species. It is very difficult to reduce $NO_x$ to $N_2$ in an oxidising or lean atmosphere. In order to treat $NO_x$ in lean exhaust gases, a component has been developed that absorbs $NO_x$ during normal lean-burn operation of the engine. This component is commonly called a $NO_x$-trap and generally it includes: (i) an oxidation catalyst (e.g. platinum) to oxidise NO in the exhaust gas to $NO_2$ in the oxidising atmosphere; (ii) a $NO_x$ storage component to store the $NO_2$ e.g. as the nitrate. The $NO_x$ storage component is generally a basic compound of an alkali metal or an alkaline-earth, such as barium oxide; and (iii) a reduction catalyst, such as rhodium. It is possible, however, to use a $NO_x$ trap formulation in certain circumstances which comprises only the $NO_x$ storage component, or the $NO_x$ storage component and one or other of the oxidation and reduction catalyst.

Intermittently, the engine is run rich, e.g. by adjusting the moment of fuel injection into one or more cylinders, or by injecting a reducing agent, e.g. a hydrocarbon fuel, into the exhaust gas, in order to remove the stored $NO_x$ and reduce it to $N_2$. This also regenerates the absorber for another store-regenerate cycle.

Another approach for removing $NO_x$ from a gas stream is by selective catalytic reduction (SCR), which comprises adding e.g. $NH_3$ to the gas and passing the mixture over a catalyst effective to react the $NO_x$ and $NH_3$ to nitrogen. Another approach is described in our WO 00/21647 (incorporated herein by reference) wherein $NO_x$ from a diesel engine exhaust gas is removed by absorbing it in a solid absorbent. The absorbent is regenerated by the action of a $NO_x$-specific reactant.

Either such process requires careful control to avoid over- or under-supply of e.g. $NH_3$, leading respectively to emission of $NH_3$ or $NO_x$. $NH_3$ is an irritant and has an unpleasant odour and, accordingly, it is undesirable to slip $NH_3$ to atmosphere. In practice this would mean positioning an oxidation "clean-up" catalyst downstream of the SCR catalyst or $NO_x$-trap to oxidise slipped $NH_3$ to $NO_x$. Therefore, slipping $NO_x$ per se, by providing inadequate levels of $NH_3$, or $NH_3$ would have the effect of reducing the overall effectiveness of the exhaust system to limit emissions.

One problem associated with $NH_3$ SCR technology is to maintain good $NO_x$ conversion when the exhaust gas temperature is relatively low, e.g. during extended idling or following cold-start. $NO_x$ conversion can be achieved using $NH_3$ at temperatures as low as 150° C. using Pt-based catalysts, but the preferred delivery form of $NH_3$, aqueous urea solution, does not decompose significantly below 200° C. Pt-based catalysts generate nitrous oxide (NO) according to equation (5) at above about 225° C.

Changes in engine test cycles have been introduced in the present Euro III standard and will govern Euro IV type approval of new vehicles. In particular, the new test cycles include the European Stationary Cycle (ESC); the European Transient Cycle (ETC); and a test for smoke opacity on the European Load Response (ELR) test. These cycles and tests include significant periods at low temperature. To attain type approval, a new vehicle will have to pass both the ETC and ESC/ELR tests.

It is stated in our WO 00/21647 that "If the $[NH_3\ SCR]$ catalyst system is associated with the $[NO_x]$ absorbent, that is the absorber is 'catalysed', the catalytic material may be for example co-precipitated or co-impregnated or co-deposited with $NO_x$ absorbent or present as one or more sandwiched layers or as fine (e.g. 10–500 microns) particles on or in a layer of absorbent or among particles of absorbent".

Elsewhere in WO 00/21647 we state that the point of injection of a $NO_x$ specific reactant can be downstream of the filter, i.e. upstream of the $NO_x$ absorbent and "in this event the temperature is typically in the range 150–300° C.".

We have looked at putting barium (a $NO_x$ absorbent) on a cerium and iron-containing SCR catalyst, and the SCR function was significantly reduced, although the ability of the composition to absorb and desorb $NO_x$ was unimpaired. In our WO 02/068099 we demonstrate the principle of using $NH_3$ (or urea) injection over a $NO_x$ trap catalyst to reduce stored $NO_x$ during lean running conditions. This arrangement is particularly useful for diesel applications. In WO 02/068099 we state: "Whichever $[NO_x$ storage] compounds are used, there may be present also one or more catalytic agents, such as precious metals, effective to promote reactions of $NO_x$-specific reactant [including $NH_3$] with nitroxy salt. Such catalysts are also known as SCR catalysts and can include iron/zeolite or $V_2O_5/TiO_2$. Where the $NO_x$ absorbent and SCR catalyst are associated, in one embodiment they are segregated. By 'segregated' we mean that they should, at least, be supported on separate supports and can therefore be disposed in separate layers above and/or below the other component or in the same layer. Alternatively, they can be coated on distinct areas of the same substrate 'brick' or on separate substrates disposed within the same system."

We have now found that it is possible to use a $NO_x$ absorbent disposed downstream of a SCR catalyst to prevent $NH_3$ slip from an SCR catalyst and $NO_x$ and $NH_3$ slip from the system as a whole. We have also found that it is possible to regenerate a $NO_x$ absorbent in a manner set out in our WO 02/068099 by intentionally slipping a controlled amount of $NH_3$ past an SCR catalyst when the catalyst is above a pre-determined temperature.

SUMMARY OF THE INVENTION

According to a first aspect, the invention provides an exhaust system for a lean-burn internal combustion engine, which system comprising a nitrogen oxide ($NO_x$) absorbent, a catalyst for catalysing the selective catalytic reduction (SCR) of $NO_x$ with a $NO_x$-specific reactant, first means for introducing a $NO_x$-specific reactant or a precursor thereof (in certain amounts, e.g. a first and second amount) into an exhaust gas upstream of the SCR catalyst and means for controlling the introduction of the $NO_x$-specific reactant or precursor thereof into the exhaust gas via the first introducing means, wherein the SCR catalyst is disposed upstream of the $NO_x$ absorbent and optionally with the $NO_x$ absorbent, wherein the control means is arranged to introduce the $NO_x$-specific reactant or the precursor thereof to the first introducing means only when the SCR catalyst is active, whereby exhaustion of $NO_x$-specific reactant to atmosphere is substantially prevented.

In one embodiment, the activity of the SCR catalyst is determined by its temperature. In a further embodiment, the $NO_x$-specific reactant or the precursor thereof is introduced when the SCR catalyst is above a first pre-determined temperature.

In another embodiment, the $NO_x$ absorbent is supported on a first substrate and the SCR catalyst is supported on a second substrate.

In another embodiment, the control means is arranged also to interrupt the supply of the $NO_x$-specific reactant or the precursor thereof to the exhaust gas when the SCR catalyst is hot enough to oxidise $NO_x$-specific reactant to NO.

In one embodiment, the supply of $NO_x$-specific reactant or the precursor thereof is interrupted when the SCR catalyst is above a second pre-determined temperature.

According to a particular embodiment, the exhaust system comprises a second means for introducing the $NO_x$ specific reactant or the precursor thereof, which second introducing means is disposed upstream of the $NO_x$ absorbent and downstream of the SCR catalyst. Desirably, the control means is arranged also to supply the $NO_x$-specific reactant or the precursor thereof to the exhaust gas only when the $NO_x$ absorbent is above a temperature at which $NO_x$ regeneration is effective and, optionally, to interrupt the supply of the $NO_x$-specific reactant or the precursor thereof to the exhaust gas when the $NO_x$ absorbent is above a temperature at which $NO_x$ storage is effectively limited.

In one embodiment, the temperature at which $NO_x$ regeneration is effective is a third pre-determined temperature. By "$NO_x$ regeneration is effective" herein, we mean, dependent on conditions such as exhaust gas mass flow and lambda composition of the exhaust gas, temperatures of the $NO_x$ absorbent above which it is possible to employ a practical $NO_x$ absorbent regeneration strategy. For example, if in practice at a particular temperature, a second generation event would be required ten seconds after a first regeneration event in order to recover $NO_x$ absorbent capacity, such a strategy would be ineffective in that it would lead to increased fuel penalty and driveability issues.

In another embodiment, the temperature at which $NO_x$ storage is effectively thermally limited is a fourth pre-determined temperature. By "effectively thermally limited" herein, we mean a temperature at which $NO_x$ conversion using the $NO_x$ absorbent is too low for practical application. This is because $NO_x$ storage on the $NO_x$ absorbent is reduced on account of the nitrate of the $NO_x$ absorbent being thermally unstable.

We have observed that when a $NO_x$-specific reactant is introduced into an exhaust gas upstream of the SCR catalyst, certain reactants, such as $NH_3$, can become adsorbed to the SCR catalyst. Suitable control methods can make allowances for this and in certain arrangements the adsorption phenomenon can be useful, e.g. for supplying low levels of $NO_x$-specific reactant to the SCR catalyst below the SCR catalyst light off temperature to effect $NO_x$ conversion. However, the adsorption can complicate control of supply of $NO_x$-specific reactant to the downstream $NO_x$ absorbent to effect the process described in our WO 02/068099. Accordingly, in one embodiment, a second, separate $NO_x$-specific reactant introducing means is provided downstream of the SCR catalyst and the $NO_x$-specific reactant or precursor thereof is introduced via only this second introducing means when the SCR catalyst is below its light-off temperature. ("Light-off" is the temperature of a catalyst at which 50% conversion of a particular reaction is achieved.)

The first and second pre-determined temperatures will depend on the nature of the SCR catalyst (see below), and on other factors such as the composition and temperature range of the exhaust gases to be treated. However, generally the first predetermined temperature will be in the range from 100–600° C., preferably 150–500° C. and most preferably 200–450° C. and the second pre-determined temperature will be from 450–900° C., preferably 550–800° C. and most preferably 650–700° C.

Like the SCR catalyst, the third and fourth pre-determined temperatures will depend on the nature of the $NO_x$ absorbent (see below), and on other factors such as the composition and temperature range of the exhaust gases to be treated. However, generally the third pre-determined temperature will be from 75–200° C., preferably 100–175° C. and most preferably 125–600° C. and the fourth pre-determined temperature will be from 350–600° C., preferably 400–550° C. and most preferably 450–500° C.

In another embodiment, the first pre-determined temperature can be the same as the third pre-determined temperature.

According to another embodiment, the exhaust system comprises a second SCR catalyst disposed downstream of the $NO_x$ absorbent.

According to a particular embodiment, the exhaust system comprises a catalyst for oxidising NO in the exhaust gas to $NO_2$ and a filter for collecting particulate matter in the exhaust gas for combustion in the $NO_2$ at up to 400° C. Such an arrangement is described in our EP 0341832 or U.S. Pat. No. 4,902,487 (the entire contents of which are incorporated herein by reference) and sold by Johnson Matthey plc as the CRT®.

Figure 1:
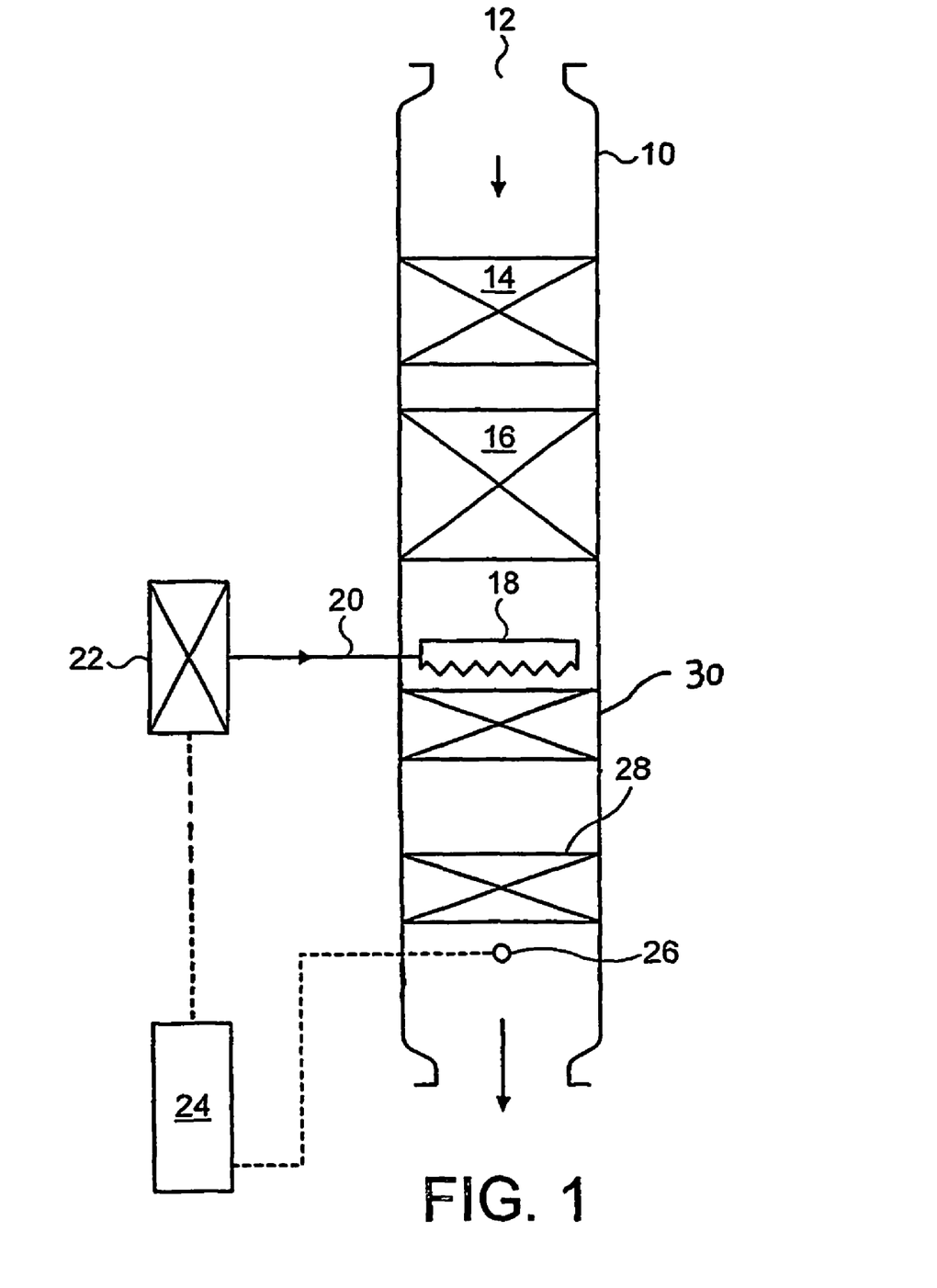
FIG. 1 is a schematic sectional view of an exhaust treatment system for lean-burn internal combustion engine.

In one such embodiment, shown in FIG. 1, the SCR catalyst is downstream of the filter. In a further embodiment, the SCR catalyst is carried by the filter. In another embodiment, both the SCR catalyst and the $NO_x$ absorbent are disposed on the filter.

In embodiments featuring the CRT®, the $NO_x$-specific reactant can be injected upstream of the SCR catalyst, such as downstream of the filter as shown in FIG. 1, between the CRT® oxidation catalyst and the filter or even upstream of the CRT® oxidation catalyst.

This last arrangement can be useful to increase $NO_x$ in the exhaust system for combusting particulate matter on the filter, as described in our WO 00/74823, the entire contents of which is incorporated herein by reference.

Control of the system is effected by the control means. In preferred embodiments, the control means receives input from sensors positioned at appropriate points in the exhaust system to detect certain conditions therein. These can include the temperature of the $NO_x$ absorbent and/or the SCR catalyst, and the $NO_x$ composition of the exhaust gas. In order to control the system to prevent slip of $NO_x$ specific reactant, suitable sensors can be used. These can be positioned downstream of the SCR catalyst and/or downstream of the $NO_x$ absorbent. In addition, or in the alternative, the control means can control the system in response to pre-determined settings in an engine speed/load map or in response to exhaust gas temperature.

Supply of $NO_x$-specific reactant can be continuous, semi-continuous, or periodic. In any case, the control means can be arranged to supply the $NO_x$-specific reactant or the precursor thereof intermittently at "spike" concentration, which can be useful for example in the method of regenerating the $NO_x$ absorbent. Where supply of the $NO_x$-specific reactant or precursor thereof is periodic, each such period between supply events can be selected from between 1 second and 10 minutes.

According to a further aspect, the invention provides a lean-burn internal combustion engine including an exhaust system according to any preceding claim. According to one embodiment, the lean-burn engine is a diesel engine or a gasoline engine. We particularly prefer engines that can be run on fuel of less than 10 ppm sulfur.

According to a further aspect, the invention provides a process for treating $NO_x$ in an exhaust gas from a lean-burn internal combustion engine, which engine including an exhaust system comprising a nitrogen oxide ($NO_x$) absorbent and a catalyst for catalysing the selective catalytic reduction (SCR) of $NO_x$ with a $NO_x$-specific reactant wherein the SCR catalyst is disposed upstream of the $NO_x$ absorbent and optionally with the $NO_x$ absorbent, which process comprising, when the SCR catalyst is inactive, contacting the $NO_x$ absorbent with insufficient $NO_x$-specific reactant to completely reduce the total $NO_x$ stored on the $NO_x$ absorbent, thereby to regenerate it, and, when the SCR catalyst is active, contacting it with sufficient $NO_x$-specific reactant to reduce $NO_x$ in the exhaust gas to $N_2$, whereby exhaustion of $NO_x$-specific reactant to atmosphere is substantially prevented.

According to one embodiment, SCR catalyst activity is determined by its temperature relative to a first pre-determined temperature.

In another embodiment of the process, the $NO_x$-specific reactant for contacting the $NO_x$ absorbent when the SCR catalyst is active does not contact said catalyst, for the reasons relating to adsorption of the $NO_x$-specific reactant to the SCR catalyst as explained above. That is, the $NO_x$-specific reactant can be introduced into the exhaust gas at a point downstream of the SCR catalyst.

In another embodiment, when said SCR catalyst is active, sufficient $NO_x$-specific reactant contacts the SCR catalyst to reduce $NO_x$ in the exhaust gas to $N_2$ and slips past the SCR catalyst to contact the $NO_x$ absorbent thereby to reduce stored $NO_x$, which process is controlled so that the slipped $NO_x$ specific reactant is insufficient to completely reduce the total $NO_x$ stored. In this embodiment, the $NO_x$-specific reactant can be introduced into the exhaust gas upstream of the SCR catalyst and optionally downstream thereof also, as desired.

In the process according to the invention, the first predetermined temperature can be from 100–600° C., preferably 150–500° C. and most preferably 200–450° C., for example.

Process features for controlling $NO_x$ absorbent regeneration may be similar to those set out in our WO 02/068099 and can include the features that at the end of regeneration, the $NO_x$ absorbent contains 5 to 50% of the content of $NO_x$ present at the start of regeneration; that regeneration is started when the absorbent contains 5 to 50% of the $NO_x$ content at which $NO_x$ slip takes place; that regeneration is controlled to stop at one of the following points: when $NO_x$-specific reactant is detected at a point part-way along the length of a substrate carrying the $NO_x$ absorbent; in a system having two substrates carrying the solid absorbent in series, when $NO_x$-specific reactant is detected at a point between the substrates; when a level of $NO_x$ content prescribed on the basis of pre-determined data in an engine speed/load map has been reached; when a level of $NO_x$ content established iteratively from an initial observation of $NO_x$-specific reactant slip has been reached; and that the $NO_x$-specific reactant is produced in situ from a precursor thereof, wherein the $NO_x$-specific reactant can be liberated from the precursor by a catalytic reaction.

The $NO_x$ absorbent and any catalyst are suitably supported on a ceramic or metal honeycomb or foam substrate, the ceramic comprising one or more of alumina, silica, titania, cordierite, ceria, zirconia, zeolite or other, generally oxidic, material or a mixture or mixed oxide of any two or more thereof. Silicon carbide is another possible substrate material. The honeycomb or foam substrate preferably carries a washcoat and, in one or more layers thereon, the active absorptive and/or catalytic material. The honeycomb has typically at least 50, for example 50–400, cells per square inch (cpsi) (7.8–62.0 cells $cm^{-2}$), possibly more, e.g. up to 800 cpsi (124 cells $cm^{-2}$), or up to 1200 cpsi (186 cells $cm^{-2}$) if composed structurally of metal. Generally the range 200–800 cpsi (31–124 cells $cm^{-2}$) is preferred for the substrate comprising nitroxy salt or absorbent and any catalyst.

The $NO_x$ absorbent may be selected from compounds of alkali metals, alkaline earth metals, rare earth metals, such as lanthanides, and transition metals, capable of forming nitroxy salt (nitrates and/or nitrites) of adequate stability in absorbing conditions and of reacting with $NO_x$-specific reactant in regenerating conditions. The "conditions" can include temperature of the gas and its redox state as expressed for example by its lambda; and/or adsorptive materials such as zeolites, carbons and high-area oxides.

Suitable alkali metals for use as $NO_x$ absorbents can be at least one of potassium, or caesium; alkaline earth metals can be at least one of magnesium, calcium, strontium and barium; and lanthanides can be at least one of lanthanum, praseodymium, neodymium and cerium.

Absorbent compounds may be present (before $NO_x$ absorption) as composite oxides, e.g. of alkaline earth metal and copper such as Ba-Cu-O or $MnO_2$-$BaCuO_2$, possibly with added Ce oxide, or Y-Ba-Cu-O and Y-Sr-Co-O. (The oxides are referred to for simplicity, but in practice hydroxides, carbonates and carboxylates such as acetates are present, depending on the temperature and gas composition).

The $NO_x$ absorbent can be associated with one or more platinum group metals (PGM) in order to effect certain processes useful to the procedure of storing $NO_x$ thereon, or reducing released $NO_x$ to $N_2$. Such PGMs can be platinum, palladium and rhodium. In one embodiment, the $NO_x$ trap PGM consists platinum alone (since any reduction function can be performed downstream), whereas in another embodiment it can include both platinum and rhodium.

The SCR catalysts for use in the present invention can be any known to the person skilled in the art, and, as mentioned above, choice of the SCR catalyst can depend on the conditions in which the catalyst will be required to work.

For example, Pt-based SCR catalysts can catalyse the reduction of $NO_x$ with $NH_3$ at between about 175° C. and about 250° C. Above 250° C. the oxidation of $NH_3$ to NO predominates, thus losing its selectivity. Medium temperature vanadium-based catalysts e.g. $V_2O_5$/$TiO_2$ operate in the temperature range between about 260° C. and about 450° C. Again beyond this higher temperature, selectivity is lost and NO is produced. If the exposure temperature of the $V_2O_5$/$TiO_2$ catalyst exceeds a certain level, the active, high surface area anatase phase of $TiO_2$ irreversibly converts to rutile with a surface area of less than 10 $m^2$/g. Normally this conversion takes place above about 550° C., but catalysts may include stabilisers to increase their thermal durability. Some $V_2O_5$/$TiO_2$ catalysts have been reported to be thermally stable up to about 700° C. In certain situations, it can be useful to include at least one of tungsten and molybdenum with base metal-containing SCR catalysts.

Zeolites can operate in the temperature range of about 350° C. to about 600° C. Zeolites suitable for use in catalysts according to the present invention include ZSM-5, mordenite, gamma-zeolite or beta-zeolite. They can comprise at least one metal or be metallised with at least one metal, which metal can be selected from one or more of Cu, Ce, Fe or Pt, and they can be ion-exchanged or impregnated.

Zeolites are characterised by their crystalline structure and $SiO_2$:$Al_2O_3$ ratio. For example, common mordenites have a ratio of about 10. When $NO_x$ is present in the exhaust gas, zeolite-based SCR catalysts do not oxidise $NH_3$ to $NO_x$. Therefore, unlike Pt or $V_2O_5$ catalysts, their selectivity towards $NO_x$ conversion continually increases with temperature. However, zeolite-based catalysts can have stability problems when exposed to high temperatures in the presence of water vapour. At exposure temperatures above 600° C., in a high water content process stream, zeolites tend to deactivate by de-alumination whereby $Al^{3+}$ ion in the $SiO_2$-$Al_2O_3$ framework migrates out of the structure. This leads to permanent deactivation and, in extreme cases, collapse of the crystalline structure.

Of course, zeolites are preferred where adsorption of $NH_3$ on a catalyst is required, see WO 99/55446.

Non-zeolite supports for any of metal-based SCR catalysts can include at least one of alumina, titania, silica, silica-alumina, ceria, zirconia, or a mixture or a mixed oxide of any two or more thereof.

As defined herein a "solid absorbent", "absorbent" and "absorbent material", "storage component" are used interchangeably; By "$NO_x$ absorbent" herein we refer to the optionally supported alkali metal, alkaline earth metal, rare-earth metal or transition metal per se, i.e. without additional catalytic metal; By "$NO_x$ trap", we refer to a substrate comprising the $NO_x$ absorbent and any additional catalytic material e.g. PGM.

The exhaust systems for the present invention are for IC engines and in particular to lean-burn IC engines. These can include gasoline lean-burn engines, such as gasoline direct injection (GDI) engines. It can also include diesel engines. In particular, diesel engines can include heavy-duty diesel engines (as defined in Europe by European Directives 88/77/EEC and 1999/96/EC). In the USA, heavy-duty vehicles are defined by gross vehicle weight rating (GVWR) 8,500 lbs in the US Federal jurisdiction and above 14,000 lbs in California (model year 1995 and later). The heavy-duty diesel category is subdivided into light heavy-duty diesel engines: <8,500 lbs<LHDDE<19,500 lbs (14,000 lbs<LHDDE<19,500 in California, 1995+); medium heavy-duty diesel engines: 19,500 lbs<MHDDE<33,000 lbs; and heavy heavy-duty diesel engines (including urban buses): HHDDE>33,000 lbs. Diesel engines can also be light-duty diesel engines as defined in Europe by European Directive 70/220/EEC, as amended by 93/59/EC and 98/69/EC. In the USA passenger vehicles, light light-duty trucks (LLDT), below 6000 lbs GVWR and heavy light-duty trucks (HLDT), above 6000 lbs are included in the light-duty diesel category.

BRIEF DESCRIPTION OF THE DRAWINGS

In order that the invention may be more fully understood, the following embodiment and Example are provided by way of illustration only and with reference to the accompanying drawings, in which.

DETAILED DESCRIPTION OF THE INVENTION

Referring to FIG. 1, the system illustrated consists of single "can" 10, which is connected at 12 to the exhaust from a diesel engine (not shown) fuelled with diesel oil of under 10 ppm sulfur content. At the inlet end of can 10 is catalyst 14, which is a low temperature light-off oxidation catalyst supported on a 400 cells/in² (62.0 cells cm⁻²) ceramic honeycomb monolith. Catalyst 14 is designed to be capable of meeting emission regulations in relation to CO and HC for the engine and vehicle and also converts the NO in the starting gas to $NO_2$ at temperatures of up to 400° C. at an efficiency of up to 70% or more.

The gas leaving catalyst 14 passes into soot filter 16, which is of the ceramic wall flow type and collects PM over 50 nm. The $NO_2$ and surplus oxygen in the gas oxidise the soot at temperatures around 250° C. as described in EP-A-0341832. The gas leaving filter 16 is passed over sparging spray injector 18, from which it receives intermittent supplies of $NH_3$ or $NH_3$ precursor via line 20 from high-pressure pump 22 under the control of computer 24. The gas leaving injector 18 passes into an SCR catalyst 30 comprising $V_2O_5/TiO_2$. Computer 24 receives data on engine running time and fuel used, on inlet gas temperature and composition and also, from sensor 26, on any slipped $NO_x$ or $NH_3$. It is programmed in particular to recalculate the $NH_3$ feed time to a shorter period and/or at a lower rate if $NH_3$ is detected in gas leaving $NO_x$ trap 28.

To facilitate replacement of $NO_x$ trap 28, the can portion containing it may be linked to the main upper and lower portion of can 10 by flanges (not shown). If provision for $SO_x$ absorption is to be made, bed 28 may be in two parts, one upstream of the other, the upstream part being the $SO_x$ absorber. When the $SO_x$-absorbing part is due for replacement, it can be replaced by a fresh $SO_x$ absorber and the can portion re-inserted with the unreplaced $NO_x$ trap in the upstream position.

In the operation of the system two phases alternate. In the absorption phase the gas contains no $NH_3$ and the $NO_x$ content of the absorber slowly increases as the $NO_x$ reacts with the absorbent to give solid nitroxy salt. The absorption phase can occur when the SCR catalyst is below its light-off temperature for catalysing the reaction of $NH_3$ and $NO_x$, or when $NO_x$ not converted over the SCR catalyst when the SCR catalyst is above said light-off temperature is present in the exhaust gas leaving the SCR catalyst. At the end of this phase the regeneration phase takes place, in which $NH_3$ is injected until part, suitably 50–90%, or possibly 5–50%, of the nitroxy salt has been reacted. During regeneration the system slips substantially no $NH_3$ downstream of $NO_x$ trap 28.

The regeneration phase can occur when the SCR catalyst is below or above its light-off temperature for catalysing the reaction of $NH_3$ and $NO_x$. When below SCR catalyst light-off temperature, the $NH_3$ or $NH_3$ precursor is metered so that substantially all of the $NH_3$ is consumed by the stored $NO_x$. When the SCR catalyst has lit off, $NH_3$ or $NH_3$ precursor is metered so that an above stoichiometric amount of $NH_3$ is present relative to $NO_x$ over the SCR catalyst so that the SCR catalyst slips sufficient $NH_3$ to regenerate the $NO_x$ trap. Stopping $NH_3$ slip past the SCR catalyst ends the regeneration phase, so that the absorption phase re-starts with absorption of residual $NO_x$ from its end-level attained in the regeneration phase. Alternatively, no provision for intentional $NH_3$ slip is made, and the $NO_x$ trap is regenerated "passively" by $NH_3$ slipped from the SCR catalyst. If the regeneration phase were continued for longer, for example up to complete decomposition of the nitroxy salt, the $NH_3$ content of the gas leaving absorber 28 would rise to its level at the start of regeneration, thus emitting $NH_3$ to atmosphere unless a clean-up catalyst were provided as in conventional continuous SCR.

EXAMPLE

A cordierite monolith (5.66 inch diameter (14.4 cm), 6 inch (15.24 cm) long, 400 cells per square inch (62.0 cells cm⁻²) with 6 thousandths of an inch (0.15 mm) thick walls) was coated with a washcoat consisting of gamma alumina (surface area 120 m² g⁻¹) in water made by slurrying sufficient solid in de-ionised water to give a solids content of 45%. The slurry was poured onto the face and down the channels of the ceramic monolith. Excess slurry was removed from the channels by compressed air. The water was then removed from the washcoat by drying in a hot air flow (150° C.). The dry coated monolith was then calcined at 500° C. for an hour. The total washcoat loading on the coated monolith was 2.5 g in⁻³ (152.6 g l⁻¹). The coated monolith was then immersed in a platinum tetra-ammine solution for five minutes, removed, and excess solution removed by suction. The monolith was then dried in a hot air flow (150° C.) and calcined at 500° C. for an hour. The concentration of solution was chosen to give a platinum loading of 100 g ft⁻³ (3.53 g l⁻¹) was achieved on the monolith. Next the monolith was impregnated with an aqueous barium acetate solution. The monolith was immersed in the solution for five minutes, removed, and excess solution removed by suction. The monolith was dried in a hot air flow (150° C.) and calcined at 500° C. for an hour. The concentration of solution was chosen such that a final barium loading of 800 g ft⁻³ (28.24 g l⁻¹) was achieved on the monolith.

Using analogous methods, SCR catalysts were prepared (on 5.66 inch (14.4 cm) diameter, 6 inch long (15.24 cm), 400 cells per square inch (62.0 cells cm$^{-2}$) with 6/1000$^{th}$ inch (0.15 mm) thick walls), a commercially available $V_2O_5/TiO_2$ catalyst available from Johnson Matthey plc.

The final monoliths were mounted in a stainless steel can using standard procedures, and fitted in the exhaust gas system of 2.2 liter, 4 cylinder turbo-charged diesel engine. The engine was coupled to a dynamometer in the conventional manner. The engine and dynamometer were computer controlled to allow a range of different engine operating conditions to be selected. Exhaust emissions of HC, CO, $NO_x$, $O_2$, and $CO_2$ pre- and post-catalyst were measured with commercial gas analysers in the conventional way. $NH_3$ was measured using a tuned infra-red laser (AltOptronic), and $N_2O$ was measured with a Unor (Germany) Instrument.

The engine was operated at 1200 rpm with a dynamometer load of 44 Nm, that resulted in a catalyst inlet exhaust gas temperature of 210° C. The catalyst inlet $NO_x$ concentration was 120 ppm, and the engine was run steadily at this condition. $NH_3$ gas was injected into the exhaust upstream of the catalyst in a 10 minute long pulse, before being turned off for a further 10 minutes. This alternation was continued 5 times. The $NH_3$ gas level during the injection period was 120 ppm.

The experiment was conducted with two SCR catalysts alone in the exhaust as a baseline, and repeated with the $NO_x$ trapping formulation behind the two SCR catalysts.

Baseline Tests:

At this temperature/flow-rate/$NH_3$ injection level, a significant amount of $NH_3$ slip is possible from the SCR catalysts. This was desired in order to let $NH_3$ reaching the $NO_x$ trapping catalyst (when present) in order to effect the method described in WO 02/068099 (the entire contents of which is incorporated herein by reference).

$NH_3$ slip gradually increased during the duration of the injection, it is believed, due to $NH_3$ storage within the SCR catalysts. After 10 minutes of injection, 53 ppm $NH_3$ slip occurred (shown FIG. 1 for a typical 10 minutes injection cycle). It was noted that with a period of >10 minutes for $NH_3$ injection, more $NH_3$ slip occurred until a steady slip of 73 ppm $NH_3$ was reached. $NO_x$ conversion due to the SCR reaction was 20% at these operating conditions.

Figure 2:
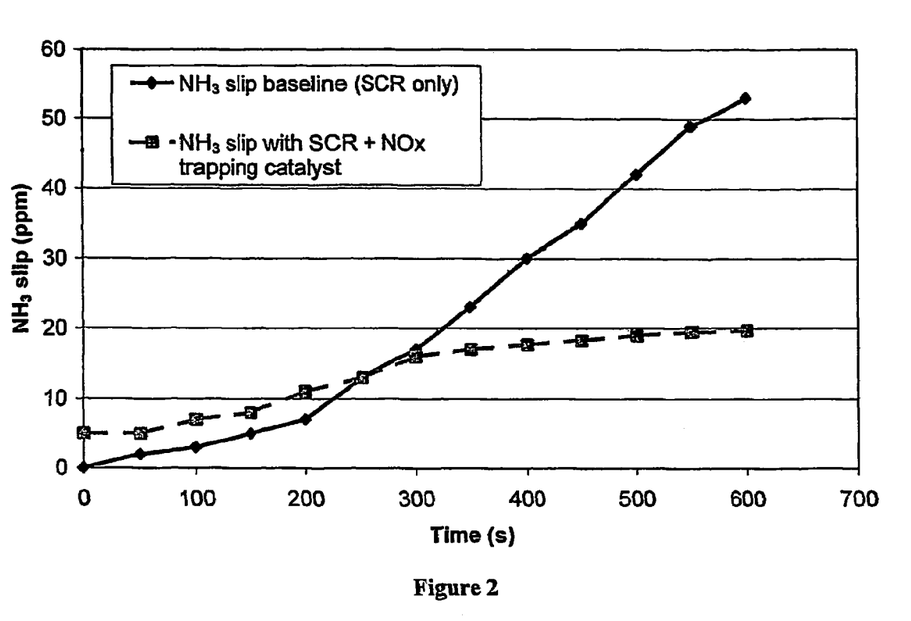
FIG. 2 is a graph comparing $NH_3$ slip in an exhaust system comprising SCR catalysts alone with that in an exhaust system comprising SCR and $NO_x$ trap catalysts.

Combined SCR and $NO_x$ Trapping Catalyst Tests:

When the $NO_x$ catalyst is present in the exhaust, significantly lower $NH_3$ slip occurs (see FIG. 2), with a maximum of 20 ppm $NH_3$ slip occurring after 10 minutes of $NH_3$ injection. This indicates that the $NO_x$ trapping catalyst can be used to prevent $NH_3$ slip in an SCR system.

Further, as demonstrated in WO 02/068099, this $NO_x$ trap formulation can store $NO_x$ at 210° C., and regenerate when exposed to $NH_3$. In the current example, 80% of the engine out $NO_x$ is slipping through the SCR catalysts, as they are not active enough for the SCR reaction under these conditions. Some of this $NO_x$ can be stored on the $NO_x$ trapping catalyst, and this $NO_x$ can be regenerated with the $NH_3$ slip.

Figure 3:
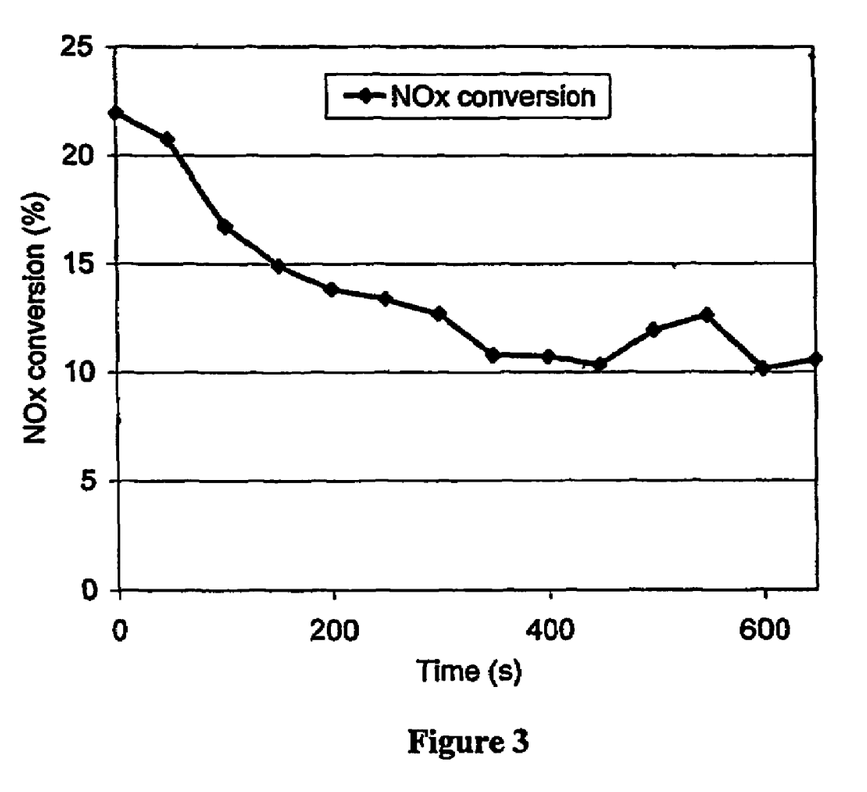
FIG. 3 is a graph showing the gradual loss of $NO_x$ conversion after $NH_3$ is turned off in an exhaust system comprising SCR and $NO_x$ trap catalysts.

FIG. 3 shows the $NO_x$ conversion after $NH_3$ injection. Clearly, when $NH_3$ is turned off, there is a gradual decrease in $NO_x$ conversion caused by a combination of $NO_x$ storage and, we believe, SCR reaction with stored $NH_3$ as we describe in WO 03/054364 (incorporated herein by reference). This effect was repeated multiple times.

The invention claimed is:

1. An exhaust system for a lean-burn internal combustion engine, comprising:
   a nitrogen oxide ($NO_x$) absorbent;
   a first catalyst for catalysing the selective catalytic reduction (SCR) of $NO_x$ with a $NO_x$-specific reactant disposed upstream of the $NO_x$ absorbent;
   first means for introducing a $NO_x$-specific reactant, or a precursor thereof, into an exhaust gas upstream of the first catalyst; and
   means for controlling the introduction of the $NO_x$-specific reactant, or the precursor thereof, into the exhaust gas via the first introducing means, wherein the means for controlling:
   (a) causes the introduction of a first amount of $NO_x$-specific reactant, or the precursor thereof, to contact the $NO_x$ absorbent insufficient to completely reduce the total $NO_x$ stored on the $NO_x$ absorbent when the first catalyst is inactive for reducing $NO_x$ to $N_2$; and
   (b) causes the introduction of a second amount of $NO_x$-specific reactant, or the precursor thereof, to contact the first catalyst when the first catalyst is active for reducing $NO_x$ to $N_2$, wherein the second amount of $NO_x$-specific reactant is of a sufficient amount such that $NO_x$-specific reactant slips the first catalyst and contacts the $NO_x$ absorbent to reduce the $NO_x$ stored on the $NO_x$ absorbent and regenerate the $NO_x$ absorbent.

2. An exhaust system according to claim 1, wherein the first catalyst has an activity determined by its temperature.

3. An exhaust system according to claim 2, wherein the means for controlling causes the introduction of the second amount of $NO_x$-specific reactant, or the precursor thereof, when the first catalyst is above a first pre-determined temperature.

4. An exhaust system according to claim 1, wherein the means for controlling is arranged to interrupt the introduction of the first amount of $NO_x$-specific reactant, or the precursor thereof, when the first catalyst is hot enough to oxidise $NO_x$-specific reactant to NO.

5. An exhaust system according to claim 1, wherein the means for controlling is arranged to interrupt the first amount of $NO_x$-specific reactant, or the precursor thereof when the first catalyst is above a second pre-determined temperature.

6. An exhaust system according to claim 1, comprising a second means for introducing the $NO_x$-specific reactant, or the precursor thereof, into the exhaust gas between the $NO_x$ absorbent and the first catalyst.

7. An exhaust system according to claim 6, wherein the means for controlling causes the second means to introduce the $NO_x$-specific reactant, or the precursor thereof, to the exhaust gas only when the $NO_x$ absorbent is above a temperature at which the $NO_x$ absorbent is regenerated.

8. An exhaust system according to claim 7, wherein the temperature above which the $NO_x$ absorbent is regenerated is a third pre-determined temperature.

9. An exhaust system according to claim 7, wherein the means for controlling causes the second means to interrupt the introduction of the $NO_x$-specific reactant, or the precursor thereof, to the exhaust gas when the $NO_x$ absorbent is above a temperature at which $NO_x$ storage on the $NO_x$ absorbent is effectively thermally limited.

10. An exhaust system according to claim 9, wherein the temperature of the $NO_x$ absorbent below which $NO_x$ storage is effectively thermally limited is a fourth pre-determined temperature.

11. An exhaust system according to claim 3, wherein the first pre-determined temperature is in the range from 100–600° C.

12. An exhaust system according to claim 5, wherein the second pre-determined temperature is in the range from 450–900° C.

13. An exhaust system according to claim 8, wherein the third pre-determined temperature is in the range from 75–600° C.

14. An exhaust system according to claim 3, wherein the first pre-determined temperature is the same as a third pre-determined temperature at which the means for controlling causes the second means to introduce a supply of $NO_x$-specific reactant, or the precursor thereof, to the exhaust gas only when the $NO_x$ absorbent is regenerated.

15. An exhaust system according to claim 10, wherein the fourth pre-determined temperature is in the range from 350–600° C.

16. An exhaust system according to claim 1 further comprising a catalyst for oxidising NO in the exhaust gas to $NO_2$ and a filter for collecting particulate matter in the exhaust gas for combustion of the $NO_2$ at temperatures up to 400° C.

17. An exhaust system according to claim 16, wherein the filter is located upstream of the first catalyst.

18. An exhaust system according to claim 16, wherein the first catalyst is disposed on the filter.

19. An exhaust system according to claim 18, wherein the $NO_x$ absorbent is disposed on the filter.

20. An exhaust system according to claim 1, comprising a second catalyst disposed downstream of the $NO_x$ absorbent.

21. An exhaust system according to claim 1, further comprising at least one sensor for detecting a concentration of the $NO_x$-specific reactant, or the precursor thereof, in the exhaust gas downstream of the first SCR catalyst.

22. An exhaust system according to claim 1, further comprising at least one sensor for detecting a concentration of the $NO_x$-specific reactant, or the precursor thereof, in the exhaust gas downstream of the $NO_x$ absorbent.

23. An exhaust system according to claim 21, wherein the means for controlling regulates the introduction of the $NO_x$-specific reactant, or the precursor thereof, in response to a detected concentration of the $NO_x$-specific reactant, or the precursor thereof, in the exhaust gas, to reduce slip of the $NO_x$-specific reactant, or the precursor thereof to the $NO_x$ absorbent.

24. An exhaust system according to claim 1, wherein the means for controlling regulates the introduction of the $NO_x$-specific reactant, or the precursor thereof, in response to exhaust gas temperature.

25. An exhaust system according to claim 1, wherein the means controlling regulates the introduction of the $NO_x$-specific reactant, or the precursor thereof, in response to a pre-determined setting in an engine speed/load map.

26. An exhaust system according to claim 1, wherein the means for controlling causes the introduction of the $NO_x$-specific reactant, or the precursor thereof, intermittently and at "spike" concentration.

27. An exhaust system according to claim 26, wherein a period between the introduction of the $NO_x$-specific reactant, or the precursor thereof, is in the range from 1 second to 10 minutes.

28. A lean-burn internal combustion engine comprising an exhaust system according to claim 1.

29. An engine according to claim 28, wherein the engine is a diesel engine or a gasoline engine.

30. A process for treating $NO_x$ in an exhaust gas of a lean-burn internal combustion engine, the process comprising the steps of:

contacting a nitrogen oxide ($NO_x$) absorbent with the exhaust gas;

contacting a first catalyst for catalysing the selective catalytic reduction (SCR) of $NO_x$ with a $NO_x$-specific reactant, wherein the first catalyst is disposed upstream of the $NO_x$ absorbent; and regenerating the $NO_x$ absorbent when:

(i) the first catalyst is inactive for reducing $NO_x$ to $N_2$, by contacting the $NO_x$ absorbent with a first amount of $NO_x$-specific reactant insufficient to completely reduce the total $NO_x$ stored on the $NO_x$ absorbent; and (ii) the first catalyst is active for reducing $NO_x$ to $N_2$, by contacting the first catalyst with a second amount of $NO_x$-specific reactant sufficient to reduce $NO_x$ in the exhaust gas to $N_2$, and to slip the first SCR catalyst to reduce $NO_x$ stored on the $NO_x$ absorbent.

31. A process according to claim 30, wherein the activity of the first catalyst is determined by its temperature relative to a first predetermined temperature.

32. A process according to claim 30, wherein the $NO_x$-specific reactant for contacting the $NO_x$ absorbent when the first catalyst is inactive does not contact said first catalyst.

33. A process according to claim 30, wherein, step (b) comprises selecting the second amount so that the $NO_x$-specific reactant that slips the first SCR catalyst is of an insufficient amount to completely reduce the total $NO_x$ stored on the $NO_x$ absorbent.

34. A process according to claim 31, wherein the first pre-determined temperature is in the range from 100–600° C.

35. A process according to claim 30, wherein the first amount of $NO_x$-specific reactant regenerates the $NO_x$ absorbent to an amount wherein the $NO_x$ absorbent contains 5 to 50% of the total $NO_x$ stored on the $NO_x$ absorbent.

36. A process according to claim 30, wherein the second amount of $NO_x$-specific reactant contacts and slips the first catalyst to reduce $NO_x$ stored on the $NO_x$ absorbent when the $NO_x$ absorbent contains 5 to 50% of the total $NO_x$ stored on the $NO_x$ absorbent.

37. A process according to claim 30, wherein the regeneration step is controlled to stop at one of the following points:

(a) when $NO_x$-specific reactant is detected at a point part-way along the length of a substrate carrying the $NO_x$ absorbent;

(b) in a system having two substrates carrying the solid absorbent in series, when $NO_x$-specific reactant is detected at a point between the substrates;

(c) when a level of $NO_x$ content prescribed on the basis of pre-determined data in an engine speed/load map has been reached;

(d) when a level of $NO_x$ content established iteratively from an initial observation of $NO_x$-specific reactant slip has been reached.

38. A process according to claim 30, wherein when the first catalyst is inactive for reducing $NO_x$ to $N_2$, the step of regenerating the $NO_x$ absorbent by contacting the $NO_x$ absorbent with $NO_x$-specific reactant has a duration of about 1 second to 10 minutes.

39. A process according to claim 30, wherein the $NO_x$ absorbent is supported on a first substrate and the first catalyst is supported on a second substrate.

40. A process according to claim 30, wherein the $NO_x$-specific reactant is produced in situ from a precursor thereof.

41. A process according to claim 40, further comprising a step of catalytically reacting the precursor to provide the $NO_x$-specific reactant.

42. A process according to claim 30, wherein the exhaust gas is that of a diesel engine.

43. An exhaust system according to claim 1, wherein the SCR catalyst is co-located with the $NO_x$ absorbent.

44. An exhaust system according to claim 11, wherein the first pre-determined temperature is in the range from 150–500° C.

45. An exhaust system according to claim 11, wherein the first pre-determined temperature is in the range from 200–450° C.

46. An exhaust system according to claim 12, wherein the second pre-determined temperature is in the range from 550–800° C.

47. An exhaust system according to claim 12, wherein the second pre-determined temperature is in the range from 650–700° C.

48. An exhaust system according to claim 13, wherein the third pre-determined temperature is in the range from 100–200° C.

49. An exhaust system according to claim 13, wherein the third pre-determined temperature is in the range from 125–175° C.

50. An exhaust system according to claim 15, wherein the fourth pre-determined temperature is in the range from 400–550° C.

51. An exhaust system according to claim 15, wherein fourth pre-determined temperature is in the range from 450–500° C.

52. An exhaust system according to claim 22, wherein the control means regulates the supply of the $NO_x$-specific reactant, or the precursor thereof, in response to a detected concentration of the $NO_x$-specific reactant, or the precursor thereof, in the exhaust gas, thereby to reduce slip of the $NO_x$-specific reactant, or the precursor thereof.

53. A process according to claim 34, wherein the first pre-determined temperature is in the range from 150–500° C.

54. A process according to claim 34, wherein the first pre-determined temperature is in the range from 200–450° C.

55. A process according to claim 30, wherein the first catalyst is active for reducing $NO_x$ to $N_2$, the step of regenerating the $NO_x$ absorbent by contacting the $NO_x$ absorbent with $NO_x$-specific reactant has a duration of about 1 second to 10 minutes.

\* \* \* \* \*

UNITED STATES PATENT AND TRADEMARK OFFICE
CERTIFICATE OF CORRECTION

| | | |
|---|---|---|
| PATENT NO. | : 7,178,331 B2 | Page 1 of 1 |
| APPLICATION NO. | : 10/526511 | |
| DATED | : February 20, 2007 | |
| INVENTOR(S) | : Philip Gerald Blakeman et al. | |

It is certified that error appears in the above-identified patent and that said Letters Patent is hereby corrected as shown below:

At column 13, line 7, "to introduce a supply the" should read --to introduce a supply of the--.

Signed and Sealed this

Seventeenth Day of June, 2008

JON W. DUDAS
*Director of the United States Patent and Trademark Office*